A. HOCKING.
MACHINE FOR CUTTING SUGAR CANE IN THE FIELD.
APPLICATION FILED MAR. 10, 1917.
1,259,400.
Patented Mar. 12, 1918.
4 SHEETS—SHEET 1.
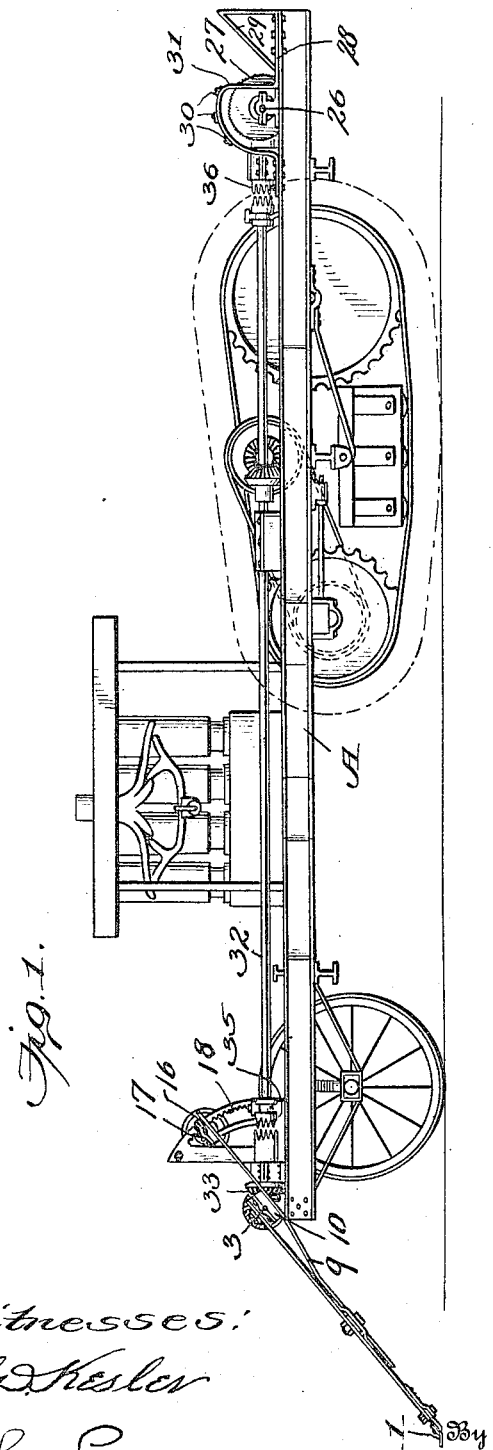
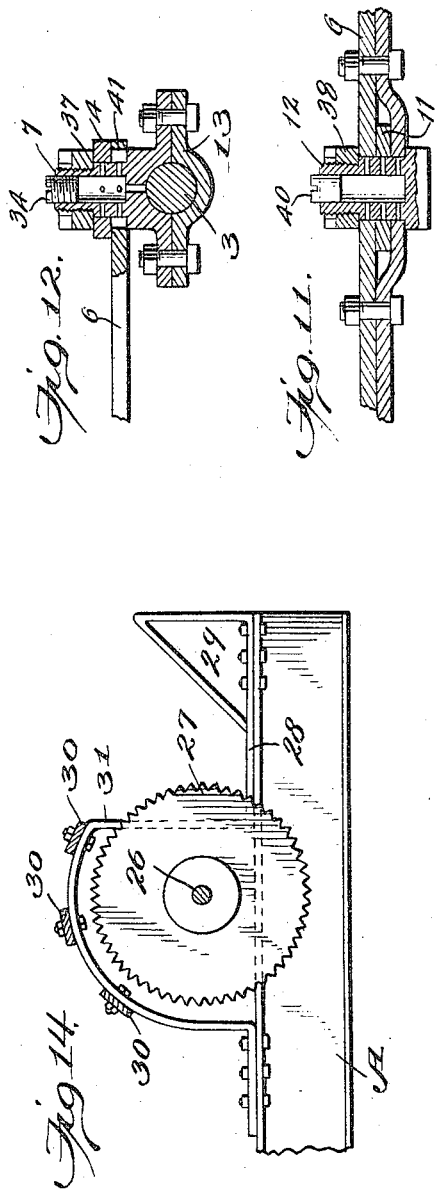
Witnesses:
Inventor
Alfred Hocking
By James L. Norris
Attorney

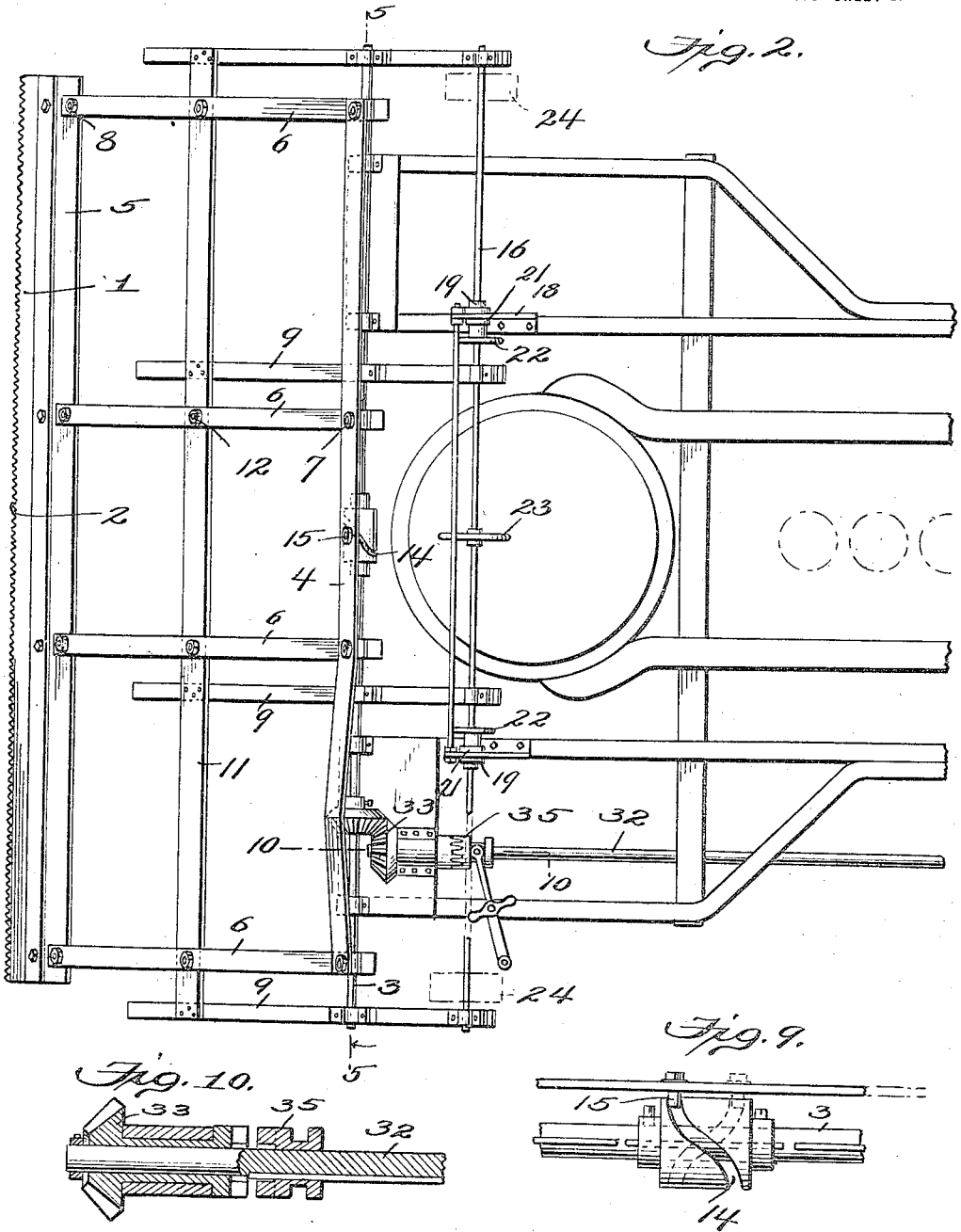

A. HOCKING.
MACHINE FOR CUTTING SUGAR CANE IN THE FIELD.
APPLICATION FILED MAR. 10, 1917.
1,259,400.
Patented Mar. 12, 1918.
4 SHEETS—SHEET 3.
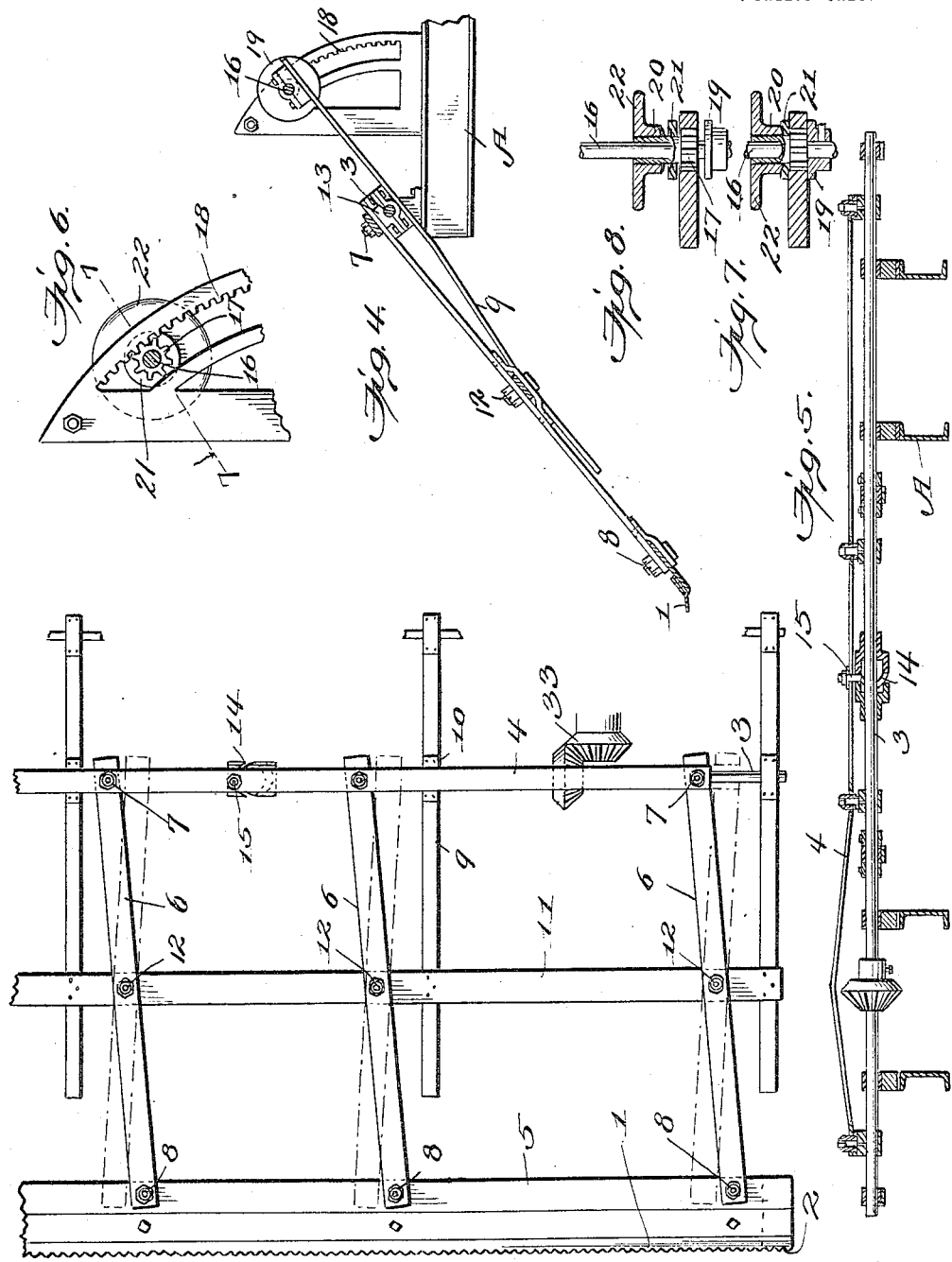
Witnesses:
Inventor
Alfred Hocking
By
James L. Norris,
Attorney

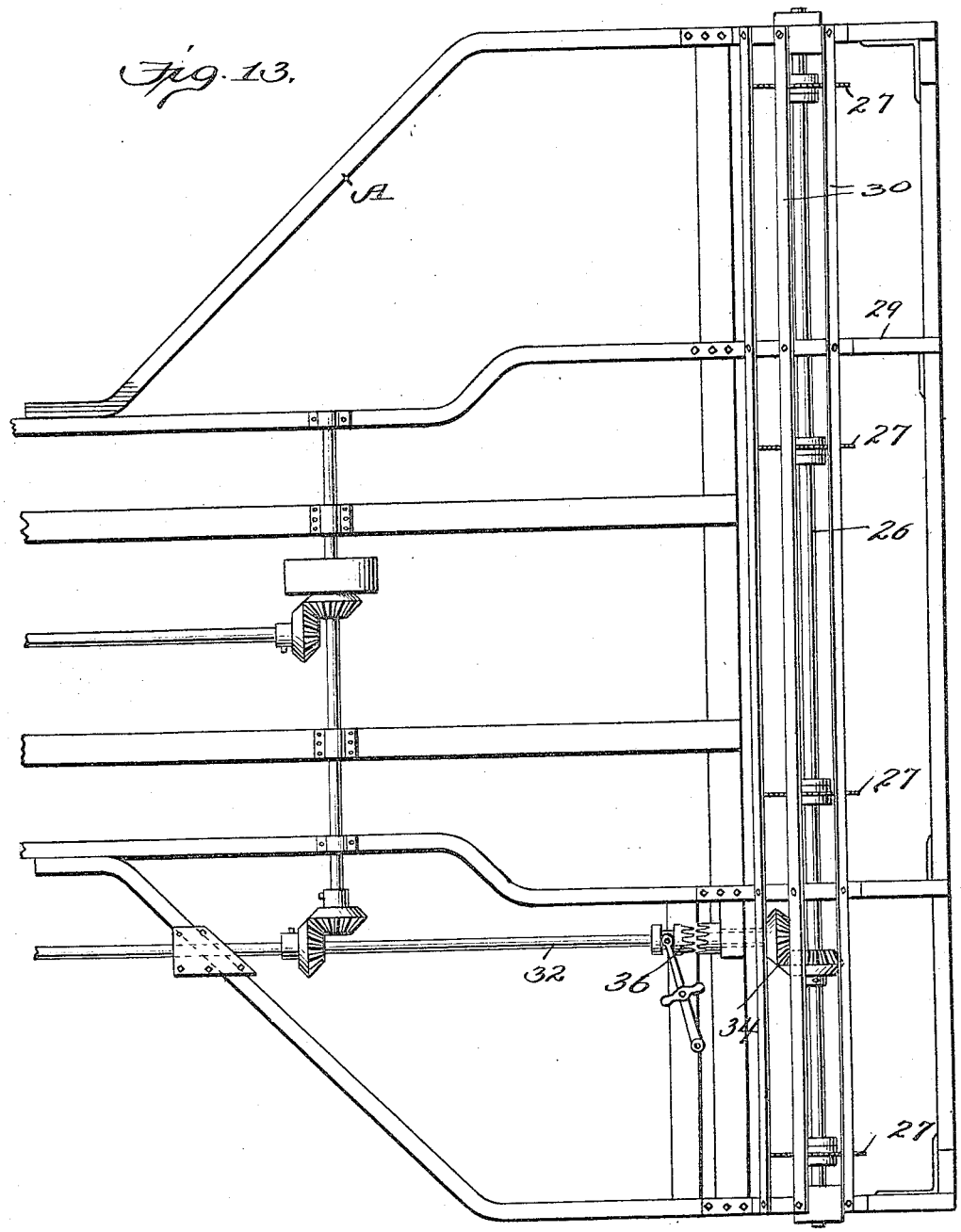

UNITED STATES PATENT OFFICE.

ALFRED HOCKING, OF HONOLULU, TERRITORY OF HAWAII.

MACHINE FOR CUTTING SUGAR-CANE IN THE FIELD.

1,259,400.   Specification of Letters Patent.   Patented Mar. 12, 1918.

Application filed March 10, 1917. Serial No. 153,979.

*To all whom it may concern:*

Be it known that I, ALFRED HOCKING, a citizen of the United States, residing at Honolulu, in the county of Honolulu and Territory of Hawaii, have invented new and useful Improvements in Machines for Cutting Sugar-Cane in the Field, of which the following is a specification.

This invention relates to improvements in machines for cutting sugar cane in the field; and its principal objects are to provide a machine which will cut the cane close to the ground, which may operate at any desired angle to the furrows and will cut the cane in straight swaths of substantial width, which will operate efficiently on cane growing on ridges as well as on cane growing on level ground, which will not be detrimentally affected by stones or similar obstacles, which will work outside of the standing rows of cane, thereby enabling the cut cane to be deflected upon an open area where the stalks may be readily gathered by attendants following the machine, and which may be operated in conjunction with means mounted on the same tractor for topping the stalks and cutting them into lengths suitable for convenient yarding or loading.

With the above objects in view, the invention consists in certain features of structure, combination and relation which will appear as the description proceeds.

What is now considered as a preferred embodiment of the invention is illustrated in the accompanying drawings, wherein:—

Figure 1 is a side elevation of a machine in which the features of the invention are incorporated;

Fig. 2 is an enlarged plan view of the front portion of the machine, showing more particularly the mechanism for cutting the standing stalks of cane;

Fig. 3 is a detail plan view of somewhat diagrammatic character illustrating the action of the means for reciprocating the transverse cutter at the front end of the machine;

Fig. 4 is a detail sectional view of the cutting mechanism at the front end of the machine;

Fig. 5 is a detail cross-sectional view on the line 5—5 of Fig. 2;

Fig. 6 is a detail view showing a rack and pinion employed as elements of a means for adjusting the elevation of the cutter at the front end of the machine;

Fig. 7 is a detail sectional view on the line 7—7 of Fig. 6, showing a locking device for the said pinion;

Fig. 8 is a view similar to Fig. 7, but showing the parts of the locking device in released or inoperative positions;

Fig. 9 is a detail elevation of a cam for vibrating or transversely reciprocating the cutter at the front of the machine;

Fig. 10 is a detail sectional view on the line 10—10 of Fig. 2;

Figs. 11 and 12 are detail sectional views of lubricant-supplying pivot pins which are conveniently employed in the construction of the front cutter operating mechanism;

Fig. 13 is an enlarged plan view of the rear portion of the machine showing more particularly the mechanism for cutting the severed stalks into lengths convenient for yarding or loading;

Fig. 14 is a detail sectional view of the cutting mechanism at the rear of the machine.

Similar characters of reference designate corresponding parts throughout the several views.

The invention may be carried out in connection with any suitable form of motor-driven tractor, although for operation on cane growing on ridges, a caterpillar tractor A, as shown in Fig. 1, is preferred.

According to the invention, the cane is cut close to the ground and in straight swaths of substantial width extending at a suitable angle to the furrows and whose direction is not affected by the direction of the furrows by a mechanism which includes essentially a transversely vibratory knife 1 which is located beyond the front of the tractor and is disposed transversely of the tractor frame with which it is in longitudinal alinement. The knife 1 is in constant vibration through a relatively short stroke and most efficiently accomplishes the purposes of the invention when formed with fine teeth 2, similar or analogous to saw teeth, throughout the length of its cutting edge. The advantage of the teeth 2 is that the cutter will efficiently discharge its functions without being especially sharp—in fact, even though somewhat dull—and, therefore, the engagement of the cutter with stones or other obstacles will be without effect in impairing the efficiency of its operation. It is preferred to employ a cutter having a transverse length of ten feet and a transverse vibratory stroke of four inches.

The cutter operating mechanism includes a transverse shaft 3 which is disposed at the extreme front end of the frame of the tractor and also provides a pivotal axis about which the cutter may be raised or lowered into any position desired. The active parts of the cutter operating mechanism comprise a rear transverse frame bar 4 located above the shaft 3, a front transverse frame bar 5 carrying the cutter 1, and a suitable number of connecting bars 6 extending between the bars 4 and 5 and pivotally connected thereto by pins 7 and 8, respectively. The bars 4, 5 and 6 constitute a frame which is of constantly varying parallelogrammic outline. The supporting or inactive parts of the cutter operating mechanism comprise a series of forwardly projecting bars 9 provided with capped blocks 10 by which they are pivotally mounted on the shaft 3 and a transverse bar 11 rigidly secured to the bars 9 near their front ends and to which the bars 6 are pivoted by means of pins 12. The bar 4 is connected preferably by means of the pins 7 to capped blocks 13 (Fig. 12) which are slidably mounted on the shaft 3, the said pins 7 being carried by and upright from the caps or upper members of said blocks. The openings 41 in the arms 6 through which the pins 7 extend are slightly elongated in the well known manner (see Fig. 12) to compensate for the movement of the pins 7 in a transversely straight path and the movement of the adjacent ends of the arms 6 through an arc whose radius is measured from the pins 12.

The means for operating the frame 4—5—6 may conveniently comprise a grooved cam 14 of any suitable or usual construction mounted on the shaft 3 and a pin or stud 15 carried by the bar 4 and engaging the groove of said cam.

The cutter operating mechanism, constructed as above described, projects in planar relation forward and downward from the shaft 3 and at a suitable angle to the frame of the tractor, as shown in Figs. 1 and 4. It is preferred to provide for the adjustment of the elevation of the cutter 1 relatively to the ground in order that the machine may be adapted to varying environments or conditions of use; and such adjustments are made by moving the bars 9 about the shaft 3 as a pivotal axis. The means preferred for this purpose utilizes rearward extensions of the bars 9 and preferably comprises a transverse shaft 16 supported at the rear ends of said bars, pinions 17 mounted on said shaft, and racks 18 with which said pinions engage. It is preferred to provide a pair of coöperating pinions and racks. Each pinion 17 has at one side thereof a fixed collar 19 and at its opposite side a threaded hub extension 20 upon which is loosely mounted a collar 21 and an adjusting nut 22 of butter-fly- or hand-wheel type. The collars 19 and 21 are sufficiently wide to engage the sides of the rack frame along which the pinion 17 operates; and when the nut 22 is tightened, said collars will be thereby caused to frictionally bind upon the rack and thus hold the pinion 17, and with it the shaft 16, at any elevation desired. In order to adjust the position of the cutter 1, the nuts 22 are first backed off, as shown in Fig. 8, at which time, the pinion 17 being free to rotate, the shaft 16 may be raised or lowered to any point desired to correspondingly lower or raise the cutter 1, relatively to the ground. For convenience of operation, the pinions 17 are keyed or otherwise made fast to the shaft 16, and said shaft carries a central hand-wheel 23 by which it may be rotated in connection with the adjustment of its elevation. The adjustment of the elevation of the cutter 1 is facilitated by providing the shaft 16 at suitably located points with weights 24 to counterbalance the weight of the mechanism which projects forwardly from the shaft 3.

At the top of the stalks there are certain elements which are detrimental to the production of sugar, and after the stalks have been cut from the ground, they must be topped. In order that they may be loaded, they must also be cut into convenient lengths. The topping and sub-division of the stalks may be accomplished in one operation and by a single mechanism which operates in conjunction with the mechanism for cutting the stalks from the ground. This second cutting mechanism is located at the rear end of the tractor and preferably comprises a continuously driven transverse shaft 26 provided at appropriate intervals with disk cutters 27 whose cutting edges are provided with teeth similar to the teeth 2 of the cutter 1 and a skeleton platform or table 28, upon which the stalks to be subdivided are placed and through which the reduced lengths of stalks fall, said table being provided with suitably arranged, inclined feed members 29 for directing the stalks, as laid transversely upon the table, toward the cutters 27. For the protection of the workmen, the said cutters are inclosed in a suitable guard which preferably is of skeleton construction and comprises a plurality of transverse bars 30 mounted on arched supports 31.

For the operations of the two cutter mechanisms, it is convenient to provide a common shaft 32 which is disposed longitudinally of the tractor and is connected to the respective shafts 3 and 26 by miter gearing 33 and 34. The shaft 32 is driven by suitable gearing from the engine of the tractor and is provided at each end with suitable clutches, preferably jaw clutches 35 and 36 by which the operation of the respective miter gear trains 33 and 34 may be controlled.

In the operation of the machine, the tractor preferably moves at a right angle to the furrows and the cane is cut in a swath whose width is substantial and corresponds to the width of the cutter 1. As the stalks are cut from the ground, they are cast to one side by the deflector 25 and are gathered up and straightened out by the attendants who follow the machine, after which they are placed upon the transversely disposed table 28 where they are topped by one of the cutters 27 and sub-divided into appropriate lengths for yarding or loading by the several cutters 27 acting as a group.

The operation of the front cutter mechanism is greatly facilitated by the construction of the various pivot pins as lubricant containers and distributers. This is shown in Figs. 11 and 12 which are detail views of the pivot pins 7 and 12. These pivot pins are of hollow tubular form, being externally threaded to carry retaining nuts 37 and 38 and internally threaded to carry closure plugs 39 and 40. They are provided with lateral ducts through which the contained lubricant is distributed to the pivotally connected parts; and the pivot pins 7 are further provided with ducts extending downwardly from their lower end and through the caps of the blocks 10 for distributing lubricant upon the shaft 3.

I claim as my invention—

1. In a machine for cutting sugar cane in the field, in combination, a tractor, a transversely disposed cutter located in advance of the tractor, a transverse shaft located at the front end of the tractor, a frame projecting forwardly from the front of the tractor and carrying said cutter, said frame including inter-connected movably mounted elements by which said cutter may be transversely reciprocated and supporting elements pivotally mountd on said shaft and means mounted on said shaft and acting on one of said first-named elements to effect the continuous transverse reciprocation of said cutter.

2. In a machine for cutting sugar cane in the field, in combination, a tractor, a transversely disposed cutter located in advance of the tractor, a transverse shaft located at the front end of the tractor, a frame mounted upon and projecting forwardly from said shaft, said frame including a transverse bar carrying said cutter, and a transverse bar adjacent said shaft, means operated by said shaft for continuously transversely reciprocating said last-named bar and connections between said transverse bars whereby the one which carries the cutter is transversely reciprocated by the other.

3. In a machine for cutting sugar cane in the field, in combination, a tractor, a transversely disposed cutter located in advance of the tractor, a frame projecting forwardly from the front of the tractor and carrying said cutter, said frame including inter-connected movably mounted elements by which said cutter may be transversely reciprocated, a transverse shaft located at the front end of the tractor upon which said frame is pivotally mounted, means operated by said shaft and acting on one of said elements to effect the continuous transverse reciprocation of said cutter, said frame having rearward extensions beyond said shaft, and means associated with said extensions to fix the same and therewith said frame in any desired position with reference to said shaft as a pivotal axis.

In testimony whereof I have hereunto set my hand in presence of two subscribing witnesses.

ALFRED HOCKING.

Witnesses:
BENJ. L. MARX,
M. F. PROSSER.

Copies of this patent may be obtained for five cents each, by addressing the "Commissioner of Patents, Washington, D. C."